United States Patent [19]
Foote

[11] Patent Number: 5,291,360
[45] Date of Patent: Mar. 1, 1994

[54] HEAD SUSPENSION ASSEMBLY FOR A DISK DRIVE

[75] Inventor: Wayne E. Foote, Eagle, Id.

[73] Assignee: Hewlett-Packard Company, Palo Alto, Calif.

[21] Appl. No.: 846,270

[22] Filed: Feb. 26, 1992

[51] Int. Cl.$^5$ .............................................. G11B 5/48
[52] U.S. Cl. ...................................................... 360/104
[58] Field of Search ........................ 360/104, 106, 105

[56] References Cited

U.S. PATENT DOCUMENTS 5,172,286 12/1992 Jurgenson ............................ 360/104
5,198,945 3/1993 Blaeser ................................. 360/104

Primary Examiner—A. J. Heniz
Attorney, Agent, or Firm—E. F. Oberheim

[57] ABSTRACT

A head suspension assembly for a disk drive has elongated members, in the form of flat strips of stainless steel, which have distal ends welded to the mounting ends of stainless steel load beams with the load beam and the stainless steel strips in alignment. Magnetic heads are mounted in corresponding positions on the distal ends of the load beams. The stainless steel strips are welded together at their distal ends with the load beams aligned with one another and the magnetic heads on the distal ends of the load beams facing in opposite directions. The stainless steel strips are of the same thickness as the reinforcing plates or swage plates which they replace. The load beams are spaced apart by the combined thickness of the stainless steel strips. An arm of an actuator is positioned between and secured to the mounting ends of the stainless steel strips, providing an A-frame type of structure which is light in weight, dimensionally stable and rigid. The A-frame structure is of reduced thickness with respect to conventional head suspensions, permitting closer disk spacing and replaces a corresponding length of heavier conventional arm structure to thereby reduce head suspension inertia.

5 Claims, 3 Drawing Sheets

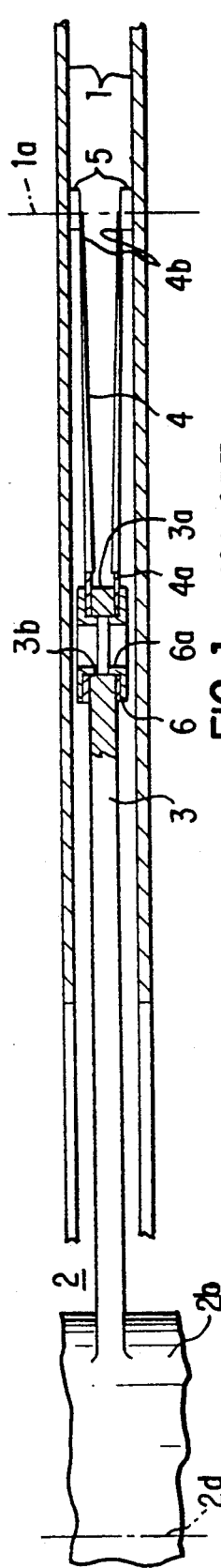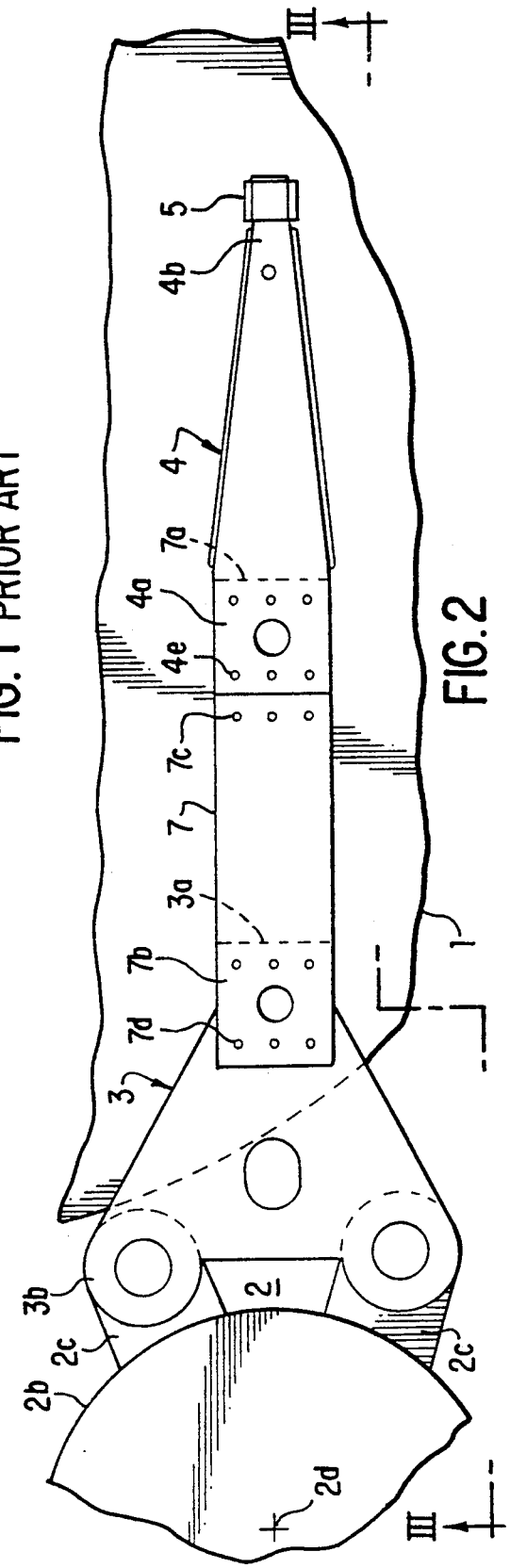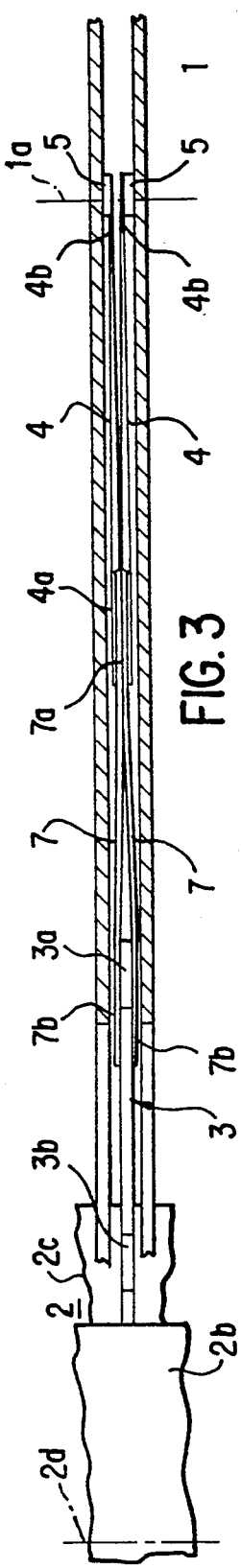
FIG. 1 PRIOR ART
FIG. 2
FIG. 3

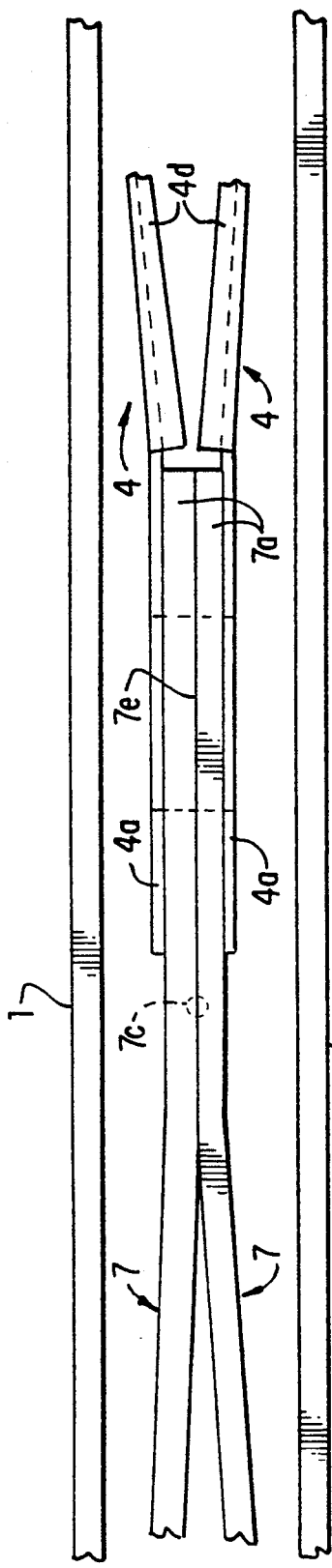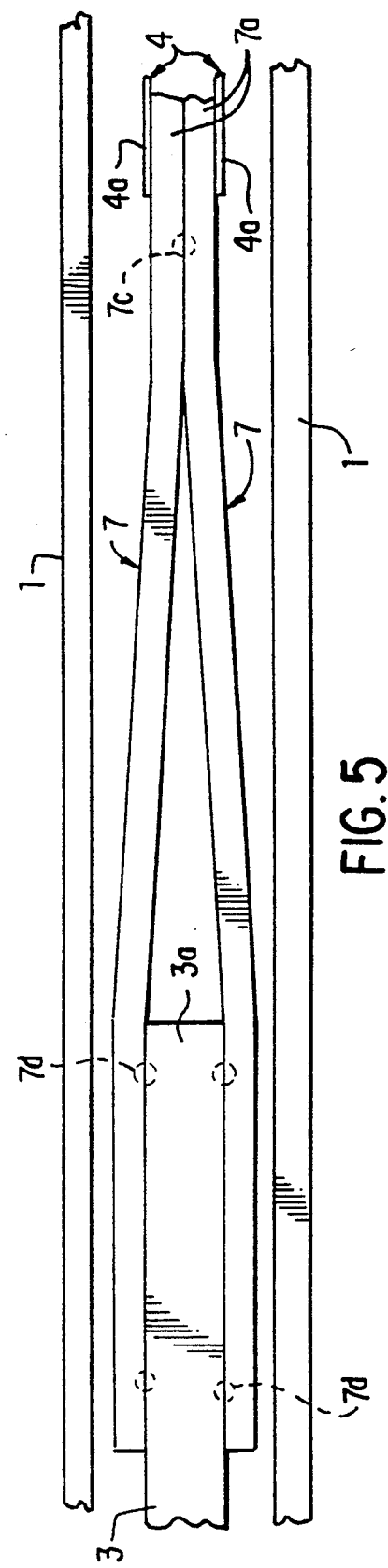

HEAD SUSPENSION ASSEMBLY FOR A DISK DRIVE

RELATED APPLICATION

The application of Michael O. King et al Ser. No. 07,842,701, entitled "Head Suspension Assembly For A Disk Drive", filed on the same day as this application and assigned to the assignee of this invention, is related to this application, now U.S. Pat. No. 5,225,949 issued Jul. 6, 1993.

TECHNICAL FIELD

This invention relates generally to disk drives and more particularly to transducer assemblies for disk drives which permit reductions in the axial spacing of disks in a disk stack.

BACKGROUND OF THE INVENTION

Trends in disk drive developments require an increase in the volumetric density of information storage and a reduction in the time required to access the stored information. One approach to increasing the density of information storage is to increase the number of disks in a given volume. This requires a reduction in the axial spacing of the disks which directly affects the design of the transducer suspension assembly, necessitating a reduction in its thickness. Increasing the number of disks increases the required number of transducers, load beams and arms for the actuator assembly, all of which add to the mass, of or weight of, the actuator assembly, which supports, moves and positions the transducers. This is inconsistent with a requirement for reducing the time required for accessing information on the disks.

A transducer assembly conventionally comprises an arm connected to an actuator to be moved thereby. The distal end of the arm is connected to one end, called the mounting end, of a flexible or resilient load beam. A transducer, for example, a magnetic head or other head, is flexibly supported on the distal end of the load beam in a position confronting the surface of the disk. In a disk stack of two or more disks, one arm of the actuator assembly will carry two such load beams in back-to-back relationship with the faces of the heads confronting the adjacent surfaces of adjacent disks in the disk stack.

The load beams are fabricated of resilient stainless steel sheet which, in one form factor, are usually of the order of three mils in thickness. The load beams have channel or U-shaped cross sections. The mounting end of the load beam which is attached to the distal end of the arm, is fabricated with a reinforcing plate which is welded thereto. This reinforcing plate, which is used to mount the load beam, also has an essential reinforcement function for bending of the load beam, during the load beam fabrication process. This bend in the load beam is made to provide the required spring loading of the head against the surface of the disk, as is well known. Common practice in attaching the load beam to the arm is to screw the mounting end of the load beam to the arm through holes provided through the load beam and the reinforcing plate. See Robert B. Watrous U.S. Pat. Nos. 4,931,641 and 4,167,765. More recently, the reinforcing plate has been provided with a boss which fits into a hole in the distal end of the arm. See Coon et al U.S. Pat. No. 4,829,395 as an example. The boss is ball swaged in that hole to securely attach the load beam to the arm. The reinforcing plate, or swage plate, is an indispensable part of the load beam structure.

In such arrangements, the reinforcing plate (insert 132), which may be 20 mils thick, as stated by Coon et al., adds to the thickness of the actuator assembly at the point of its attachment to the distal end of the arm, which is a factor in any attempt to reduce disk spacing. Prior art practice, whether the load beam is attached to the distal end of the arm by means of screws or by ball swaging, places the reinforcement plate between the load beam and the distal end of the arm. Thus the thickness of the actuator assembly at the distal end of the arm, which comprises the sum of the thickness of the arm, twice the thickness of a load beam, twice the thickness of a reinforcing plate, twice the thickness of a screw head, if screw attachment is used, and twice the clearance between a disk surface and the arm assembly at the distal end of the arm, determines the minimum axial spacing of the disks. There must be clearance between the disk and the arm assembly for mounting error tolerances and relative movement of the various structures during shock and vibration.

The patentees Coon et al, in U.S. Pat. No. 4,829,395, discuss the prior art arrangement aforesaid and, in an effort to achieve a reduction in disk spacing, disclose an arm structure to reduce the thickness of the actuator assembly measured across the mounting ends of the load beams adjacent the distal end of the arm, i.e., the load beam/arm attachment, by placing the load beam between the reinforcing plate (insert 132) and the arm. Then, by controlling the actuator assembly to prevent the reinforcing plates (inserts 132) from passing between the adjacent disks, the disk spacing may be reduced by twice the thickness of a reinforcing plate (insert 132). This, of course, assumes that the combined thickness of the two heads, their flexure mounts, the thickness of the distal ends of the load beams, and the clearance between the distal ends of the load beams, is less than the thickness of the actuator assembly at the load beam/arm attachment location.

FIG.1 of this application illustrates a prior art structure of the type disclosed and patented by Coon et al. Axially spaced disks 1 rotate about an axis 1. An arm 3 of an armstack structure, has a distal end 3a to which the mounting ends 4a of a pair of load beams 4 are attached. The distal ends 4b of the load beams 4 flexibly mount the transducers 5 which have faces which confront respective surfaces of the adjacent disks 1. A swage plate 6 is welded to the mounting end 4a of each load beam 4. A boss 6a is an integral part of each swage plate 6. The load beams are disposed against opposite faces of the distal end 3a of the arm 3, in which position the bosses 6a project into opposite ends of an opening 3b in the distal end of the arm 3. These bosses are ball swaged in the hole 3b to secure the load beam to the arm 3.

The swage plates 6 are shown in a position between the disks 1. According to Coon et al, if the swage plates 6 are prevented from passing between the disks, the disk spacing may be reduced a distance equal to twice the thickness of the swage plates 6. In that situation the disks need to clear only the load beams 4, since the swage plates 6 remain outside the peripheral edges of the disks 1.

As will be seen by reference to FIG.1 herein, using the Coon et al. swage plate thickness of 20 mils, this spacing, from that required to clear the swage plates 6, may be reduced by 40 mils, providing the same clearance for the load beams as that which had been provided for the swage plates. A reduction in disk spacing by this approach, however, is limited by the axial dimension of the bosses 6a. The bosses must be of sufficient length to obtain and maintain a secure grip on the wall of the hole 3b. Additionally clearance is required between the ends of the bosses sufficient to avoid end-to end contact during swaging.

In a more recent prior art design, the bosses are designed so that one boss fits within the other within the hole in the arm. This is known as an interlocking swage. Ball swaging through the inner boss simultaneously secures the bosses together and secures the outer boss in the hole in the distal end of the arm. This reduces the thickness of the arm/load beam assembly.

SUMMARY OF THE INVENTION

This invention, in a disk drive, is directed to a head suspension assembly of reduced thickness and weight for the purposes, respectively, of permitting a reduction in disk spacing and for reducing inertia, the latter as an aid in reducing seek times in accessing information stored on a disk. A head suspension assembly according to this invention, comprises a pair of transducers or heads, a pair of load beams, flexures for flexibly mounting the heads on the distal ends of the load beams, and means for supporting the load beams in back-to-back relationship with the working faces of the heads facing in opposite directions from one another, between and confronting the surfaces of an adjacent pair of axially spaced disks in a disk stack.

The means for supporting the two load beams in back-to-back relationship comprises two metal strips of weldable material. These metal strips, called head base strips herein, are secured at their distal ends to corresponding faces of the load beams at the mounting ends of the load beams. The distal ends of the head base strips in the region where they are joined to the load beams are secured together in face-to face relationship, positioning the load beams in alignment, in back-to-back relationship. The opposite ends of the head base strips, the mounting ends, are secured to opposite faces of an actuator arm, forming part of an actuator assembly.

The head base strips at their mounting ends, being supported by the actuator arm and spaced from one another by the thickness of the actuator arm at their mounting ends, and being joined together at their distal ends, define a triangular wedge shaped structure, or A-frame type of structure, having structural rigidity and long-column stability.

The head base strips, each having a thickness substantially the same as that of the prior art reinforcing plates, in the same form factor, presents a head suspension thickness dimension between the disks of only 46 mils, calculated as follows:

| | |
|---|---|
| Two 20 mil head base strips | 40 mils |
| Two 03 mil load beams | 06 mils |
| | 46 mils |

This structure of the head base strips 7 is also of significantly less mass than a corresponding length of actuator arm. The substitution of this light weight, head base strip structure for the corresponding part of the heavier actuator arm structure reduces the weight or mass and consequently reduces the moment of inertia of the head suspension assembly for both linear and rotary actuator applications in disk drives.

BRIEF DESCRIPTION OF THE DRAWINGS

The invention will be better understood by reference to the following specification when considered in conjunction with the accompanying drawings, in which:

FIG.1 is a fragmentary edge view, partly in section, of a prior art disk drive, illustrating the details of the arm/load beam assembly of the actuator structure.

FIG.2 is a fragmentary plan view of a disk drive, illustrating an actuator structure having a head suspension assembly embodying the principles of this invention.

FIG.3 is a sectional view taken on the line III—III of FIG. 2.

FIG.4 is an enlarged edge view of that portion of the head suspension assembly at the attachment of the mounting ends of the load beams to the distal ends of the head base strips.

FIG.5 is an enlarged edge view of that portion of the head suspension assembly at the attachment of the mounting ends of the head base strips to the distal end of the actuator arm.

BEST MODE FOR PRACTICING THE INVENTION

Figure 6A:
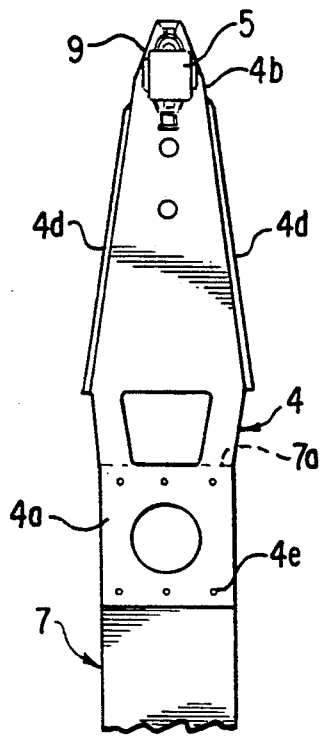
FIGS.6A and 6B are plan and perspective views, respectively, of a portion of the head suspension assembly which illustrates the details of the front face of the load beam.

The best mode for practicing the invention, presently known to the applicant, is seen in the drawings. Here, by way of example, the invention is embodied in a rotary actuator type of disk drive comprising a rotatable disk 1 and a rotary actuator assembly 2.

The improvement over the prior art structure of FIG.1 provided by this invention, is readily seen upon an inspection of the drawings, which, as to FIGS. 1. 2 and 3 are drawn to the same scale. As in FIG.1, and according to conventional practice, the disks in FIGS.2 and 3, are again rotatably supported to be rotated about a disk spindle axis 1a, at a predetermined constant speed. The disks are axially stacked and significantly reduced in axial spacing, as seen in FIG.3, with respect to that axial spacing seen in FIG.1, due to the reduction in the thickness dimension of the armstack structure,, particularly at the load beam/head base strip juncture 4a, 7a, as seen in FIGS.3, 4 and 5. The rotary actuator assembly 2 is supported to rotate about an actuator spindle axis 2d. The actuator assembly 2 comprises a bearing housing 2b which rotates about the actuator spindle axis 2d, an arm 3 connected to the bearing housing at supports 2c, each having a mounting end with a flat surface, load beams 4, heads 5 on the distal ends 4b of the load beams 4, head base strips 7 having distal ends 7a in the shaped flat end section connected to the flat surface at the mounting ends 4a, respectively, of the load beams 4 and mounting ends 7b connected to the distal end 3a of the arm 3. As seen in FIG.2, the assembly from the arm 3 to the heads 5 is thinner than such assemblies in the prior art and, being structured as disclosed, passes in its entirety between the closely spaced disks.

Fabrication of the head suspension assembly requires very little change in the fixtures and processes for fabricating the load beams. All that is required to fabricate this thinner load beam assembly is to substitute the head base strips 7 for the prior art swage or reinforcing plates 6. For a given form factor, the load beam 4 is unchanged. The head base strip 7 may be of the same thickness and of the same material as the prior art reinforcing plates of the same form factor. Thus, welding of the head base strips 7 at their distal ends 7a to the load beams 4 is unchanged. Similarly, clamping of this welded assembly and bending of the load beam requires no significant change in fixtures or in bending techniques. Joining of the faces 7e, FIG. 4, on the head base strips 7 of these load beam assemblies to position the load beams in back-to-back relationship, is accomplished by swaging, by bonding, using a suitable adhesive, such as epoxy, or, as preferred in the presently known best mode for practicing this invention, by laser spot welding together the head base strips 7, using two or more spot welds 7c, FIG.2, at a location adjacent the ends of the load beams at their mounting ends 4a.

The load beam assembly thus formed is jigged together with an arm 3 and preferably adhesively bonded or welded to the arm. If the arm is an integral part of an arm stack structure 2, as seen in FIG. 1, jigging of individual load beam assemblies may be accomplished using jigging techniques, practiced in prior art assemblies of the type of FIG. 1, for ball swaging of the load beams to the arms, excepting that adhesive bonding is now employed to secure the head base strips to the opposite faces of the arm. In the case of FIGS. 2 and 3 where the arm 3 is separate from the bearing housing 2b, the head suspension assembly is completed as an assembly which is separate from the bearing housing part 2b of the actuator assembly 2. These separate head suspension assemblies are thereafter jigged in alignment with one another at the bearing housing supports 2c after which the tabs 3b of the arms 3 are securely clamped to the supports, as by bolts, not shown, as taught in U.S. Pat. No. 4,994,931, entitled Actuator Structure For A Magnetic Head Suspension Assembly In A Disk Drive, Wayne E. Foote inventor, assigned to the assignee of this invention, and incorporated herein in its entirety by reference thereto.

Figure 6B:
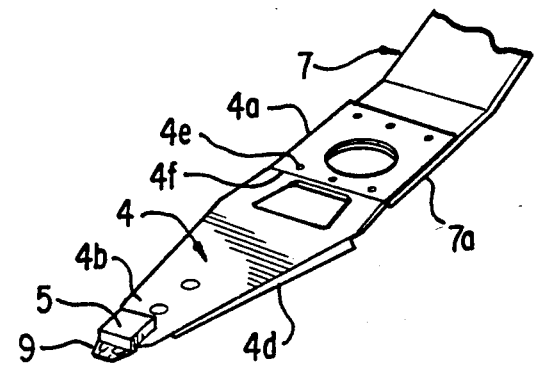
Figure 7A:
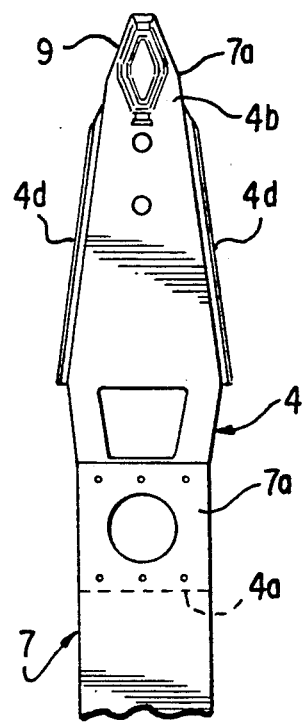
FIGS.7A And 7B are plan and perspective views, respectively, of a portion of the head suspension assembly which illustrates the details of the back face of the load beam.
Figure 7B:
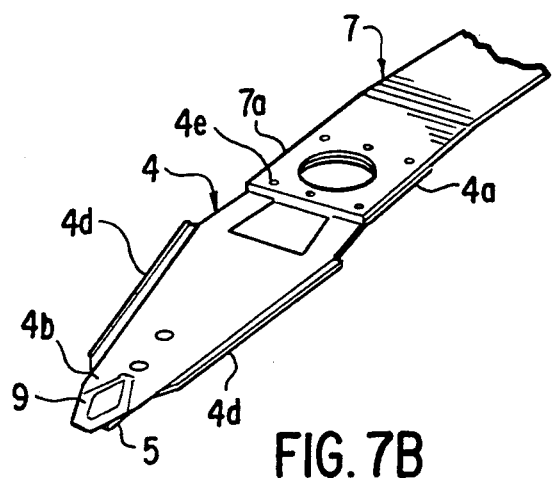

Details of the front face of a load beam 4 are presented in FIGS.6A and 6B and the back face of a load beam in FIGS.7A and 7B. The mounting end 4a of the load beam 4 is flat and is welded by laser spot welding at locations 4e to the distal end 7a of the head base strip 7. At the distal end 7a of the head base strip 7, the load beam 4 is bent along a line 4f, FIG.6B, across the front face of the load beam, upwardly, as viewed. The bend angle depends upon the spacing between the mounting ends 4a of the load beams and the spacing between the disks to achieve a particular preloading force for the head. The load beam is tapered in width from its mounting end, narrowing in width toward and at its distal end to reduce its weight. The transducer or head 5 is mounted for limited spring loaded freedom in roll and pitch, while having directional stability, by means of a thin stainless steel leaf spring 9 having displaced sections from a flat plane, one section of which is welded to the distal end 4b of the load beam and the other section of which is bonded to the head 5, as is well known. Flanges 4d, as seen in FIGS.6A and 6B, are bent downwardly from the front surface of the load beam, along the tapered side margins, between the mounting end and the distal end, to stiffen the load beam in the flange region, so that spring loading of the transducer against the disk is determined by load beam deflection at the region of the bend 4f. Preferably the flanges are narrower at the distal end 4b of the load beam to reduce the weight towards that end.

In this improved design, in which the load beams 4 are welded in back-to-back pairs to the head base strips, and the head base strips, in turn, are welded to an arm of reduced length, the head base strip section of the head suspension assembly can be made of substantially thinner material than that of an arm of the type of FIG.1, for example, and still meet the stiffness requirements of the transducer suspension assembly part of the arm stack structure. The reduction in drive or actuator assembly inertia is achieved by eliminating weight from the transducer suspension assembly in the region of the head base strips 7. Since this weight reduction is at a location in the rotary actuator assembly at a large radius from the actuator spindle axis 2b, the angular moment of inertia is significantly reduced. This increases angular acceleration for a given torque about the actuator spindle axis 2d, which, it will be appreciated, reduces seek time.

High stiffness is achieved with the thinner material by welding the mounting ends 7b of the head base strips to opposite faces of the distal ends 3a of the arm 3 and welding together the faces 7e of the distal ends 7a of the head base strips 7 at or adjacent to their attachment to the mounting ends 4a of the load beams 4, as seen at 7c. The triangular open wedge shapes, or A-frame structure so formed, provides much higher stiffness than could be achieved by using the same thickness of flat material.

The disclosed transducer suspension assembly is also a low cost design. Both the arm 3 and the head base strips are easily stamped from flat sheet material. The load beams 4 for a given form factor exist and are usable as fabricated. The head base strips 7 need not be bent prior to assembly and welding, although this is a matter of choice, since welding after clamping of the head base strips 7 at their distal and mounting ends, in assembled position in the transducer suspension assembly, is easily accomplished and the slight curvature introduced in the strips 7 does not degrade the long column stability requirement for the intended function.

A material such as stainless steel is preferred for the disclosed structure and its application. Stainless steel is non magnetic, is easily stamped and formed of thin sheet into desired shapes which are dimensionally stable, is easily weldable and the fabricated structure, having the same thermal coefficient of expansion among its parts, does not experience slip at its joints during environmental thermal cycling. The skilled in the art, however, will appreciate that other materials exhibiting non magnetic properties and requiring other methods of securing such materials, may be substituted for that which is presently preferred while practicing this invention.

What is claimed is:
1. A disk drive, comprising:
 a. a disk stack of at least two axially spaced, rotatably mounted disks having confronting disk surfaces;
 b. an arm having opposite surfaces;
 c. a pair of substantially flat elongated member, one secured to each of said opposite surfaces, said elongated members having flat distal end regions joined together forming a single flat distal end region having opposite faces;

d. a load beam secured to each face of said opposite faces, each load beam having a distal end;
e. a transducer mounted on the distal end of each load beam, and
f. means for movably supporting said arm to move said transducers to different radial locations between said at least two axially spaced disks.

2. The disk drive according to claim 1, comprising:
a. means for flexibly mounting a transducer on said distal end of each load beam.

3. The disk drive according to claim 2, in which:
a. said means for flexibly mounting a transducer on the distal end of each load beam comprises a leaf spring.

4. The disk drive according to claim 1 in which:
a. said elongated members are coextensive, and
b. said means for movably supporting said arm comprises a rotary actuator.

5. A head suspension assembly for a disk drive, comprising:
a. a pair of elongated load beams, each having a mounting end and a distal end;
b. a head mounted on the distal end of each load beam;
c. a pair of elongated members each having a distal end of predetermined thickness and a mounting end;
d. means for securing the distal end of each elongated member to the mounting end of each load beam;
e. means for securing together the distal ends of said elongated members with said load beams spaced apart by the combined thickness of said elongated member, with said load beams and said elongated members in alignment with said heads facing in opposite directions, and
f. means disposed between and secured to the mounting ends of said elongated members for spacing apart said mounting ends, defining a substantially a-frame structural configuration.

* * * * *